United States Patent [19]

Shell

[11] Patent Number: 4,502,969

[45] Date of Patent: Mar. 5, 1985

[54] WORKOVER AND COMPLETION FLUIDS

[75] Inventor: Francis J. Shell, Bartlesville, Okla.

[73] Assignee: Phillips Petroleum Company, Bartlesville, Okla.

[21] Appl. No.: 367,824

[22] Filed: Apr. 12, 1982

[51] Int. Cl.³ ............................................. E21B 43/00
[52] U.S. Cl. ........................... 252/8.55 R; 166/305 R
[58] Field of Search ................. 252/8.55 R, 8.5 LC, 252/8.5 C; 166/275, 283, 305 R, 308

[56] References Cited

U.S. PATENT DOCUMENTS

| | | | |
|---|---|---|---|
| 2,604,447 | 7/1952 | Cummer et al. .................... 252/8.5 |
| 3,891,565 | 6/1975 | Colpoys ............................. 252/8.55 |
| 3,898,294 | 8/1959 | Priest et al. ....................... 252/8.55 |
| 3,988,246 | 10/1976 | Hartfiel ........................... 252/8.55 R |
| 3,993,570 | 11/1976 | Jackson et al. ................. 252/8.55 R |
| 3,998,742 | 12/1976 | Walker ................................ 252/8.5 |
| 4,046,197 | 9/1977 | Gruesbeck et al. ............. 252/8.5 X |
| 4,235,965 | 11/1980 | Walon .................................... 435/95 |

*Primary Examiner*—Herbert B. Guynn
*Attorney, Agent, or Firm*—L. M. Lavin

[57] ABSTRACT

When added to a water-based workover or completion fluid, a mixed polysaccharide such as a malto-dextrin reduces the gel strength and water loss from said fluid, simultaneously increasing yield point.

24 Claims, No Drawings

WORKOVER AND COMPLETION FLUIDS

This invention relates to fluids used in the completion and servicing of wells. In one aspect, this invention relates to the reduction of fluid loss from workover and completion fluids. In another aspect, this invention relates to the increase of viscosity in workover and completion fluids.

BACKGROUND OF THE INVENTION

Various types of wells are drilled into subterranean formations in search of water or steam such as in geothermal wells, oil, gas, uranium, and coal. Workover and completion fluids are those fluids used in the completion and servicing of such wells. Drilling muds or drilling fluids, unlike workover and completion fluids, are those fluids used in the drilling of the well. The compositions of workover and completion fluids can differ from the compositions of drilling muds since workover and completion fluids have functions which differ from those of drilling fluids. A workover or completion fluid differs from a drilling fluid in several ways. A workover fluid does not have to be compatible with drilled solids. Usually, a workover fluid is used in cased holes, and the formation is exposed only at perforations. Whereas a drilling fluid must protect the formation from swelling or disintegration, a workover fluid must not damage the permeability of the formation. Ideally, a workover fluid would contain no solids. If solids must be used, they should be acid soluble. Similarly, the compositions, properties and functions of workover fluids can differ from those of completion fluids.

Drilling muds are those fluids used in rotary drilling to cool and lubricate the bit, lift cuttings from the borehole, and to control borehole pressure. Drilling muds should have a viscosity, density, and a fluid retention level suitable for the particular drilling application and the formation being drilled. For instance, a drilling mud generally must be sufficiently dense to control the pressure of the well and simultaneously sufficiently plastic to carry and lift cuttings from the well.

Completion fluids are those fluids used after drilling is complete and during the steps of completion of the well. Completion can include cementing the casing, perforating the casing, setting the tubing and pump, etc.

Workover fluids are those fluids used during remedial work in the well. This can include removing tubing, replacing a pump, cleaning out sand or other deposits, reperforating, etc. Workover also broadly includes steps used in preparing an existing well for secondary or tertiary oil recovery such as polymer additions, micellar flooding, steam injection, etc., or for well stimulation such as acidizing, fracturing the formation, etc.

Both workover and completion fluids are used in part to control well pressure, to prevent the collapse of tubing from overpressure, and to prevent or reduce corrosion of casing. A drilling fluid may be suitable for completion or workover applications in some cases, but not in all cases. When a special workover or completion fluid is used, it is usually a poor or unsuitable drilling fluid.

Although there has been considerable progress in the field of workover and completion fluids, there is significant room for further improvement. For instance, workover and completion fluids which retain their properties at elevated temperatures are in demand.

SUMMARY OF THE INVENTION

It is thus one object of this invention to provide an improved completion fluid and an improved workover fluid. Another object of this invention is to provide a substantially clay-free workover and completion fluid.

Another object of this invention is to provide an additive to workover and completion fluids which will improve the suspension of weighting agents.

A still further object of this invention is to reduce fluid loss from workover and completion fluids from the well into the surrounding formation during workover or completion operations at elevated temperatures up to about 400° F.

Another object of this invention is to provide a workover or completion fluid having a viscosity, gel strength and shear strength suitable for well workover and well servicing operations.

These and other objects, advantages, details, features, and embodiments of this invention will become apparent to those skilled in the art from the following detailed description of the invention and the appended claims.

It has been discovered that mixed polysaccharides such as malto-dextrins can effectively suspend weighting agents in workover and completion fluids. It has also been discovered that mixed polysaccharides such as malto-dextrins can reduce the loss of fluid or filtrate from workover and completion fluids into the formation surrounding the well. Furthermore, it has been found that such mixed polysaccharides can reduce the gel strength of an undesirably gelled or highly thixotropic workover or completion fluid.

DETAILED DESCRIPTION OF THE INVENTION

Polysaccharides are generally known as a large and abundant group of complex, naturally-occurring high molecular weight carbohydrates which serve either as reserve nutrients (i.e., starches, glycogen, etc.), skeletal materials (e.g., cellulose) or perform both functions (e.g., certain mannans and galactans). The polysaccharides are formed of individual monosaccharide units linked together in glycosidic fashion to form long chains which may possess either a linear structure, as in cellulose, or branched structures, as in glycogen. The individual monosaccharide units can be hexose or pentose sugars. The polysaccharides presently of interest as additives for workover or completion fluids are the nutrient polysaccharides comprising starch, which are classified as hexosans based on their yielding hexose sugar residues upon acid hydrolysis. Starch consists of two polysaccharides, amylose and amylopectin. The term "mixed polysaccharide" refers to a polysaccharide having more than one monosaccharide monomeric unit. Examples include malto-dextrins, fructo-dextrins, lacto-dextrins, and the like. The monomeric units need not alternate, but can appear as blocks or branches.

The mixed polysaccharides presently preferred for the practice of this invention are malto-dextrins, also known as hydrolyzed cereal solids, prepared by the acid or enzymatic hydrolysis of oxidized starch. See, e.g., U.S. Pat. Nos. 3,974,033; 3,974,034; 3,663,369; and 4,235,965. Malto-dextrins are described as starch hydrolysates having a measurable dextrose equivalent value not substantially above 20 and containing relatively small amounts of dextrose and maltose (e.g., less than about 2.4 weight percent dextrose and less than about 9 weight percent maltose). Such malto-dextrins are commercially available under the tradenames Mor-Rex ® (Corn Products, a unit of CPC International, Inc., Englewood Cliffs, N.J.), Maltrin ® (Grain Processing Corp.), Frodex ® (American Maize Products Co.) and Star-Dri (A. E. Staley Mfg. Co.). Analysis of Mor-Rex ® malto-dextrin reveals that its carbohydrate composition is as follows:

| | |
|---|---|
| Dextrose | 1% |
| Di-saccharide | 4% |
| Tri-saccharide | 5% |
| Tetra-saccharide | 4% |
| Penta-saccharide | 4% |
| Hexa-saccharide and above | 82% |

As well pressures increase, the specific gravity of workover and completion fluids also must increase for the fluid to control the well pressure. Weighting agents such as minerals like barite (barium sulfate), typically in the presence of a clay as a suspension agent, can be added to a water or oil-based fluid to increase the fluid's density. However, the addition of clays, minerals and other additives can cause problems. Clays such as bentonite and minerals such as barite are generally not acid soluble and cannot easily be removed from the formation should they leak from the fluid into the formation. Particles of the clay can be carried with the workover or completion fluid into the pores and crevices of the formation, and thus plug off flows from the formation into the well.

In one embodiment of this invention, a workover or completion fluid having improved fluid retention properties, stability, ability to suspend weighting agents, and a suitable viscosity, is provided. The fluid comprises a base fluid, a viscosifier, mixed polysaccharides and an optional suspension agent such as clay. Weighting agents or electrolytes can optionally be present in the fluid, separately or in combination. It is important that the ingredients of a workover and completion fluid not cause swelling or disintegration of the formation. Although swelling and disintegration of the formation is less of a problem once the well is drilled and the casing is set, swelling and disintegration of the formation at any period in the life of the well can cause problems. If the clay, shales, etc. which comprise the formation near the casing perforation swell and disintegrate, the casing perforation can be plugged or the formation can collapse, blocking flow into the well. To avoid interactions of the fluid with the formation, the ingredients of the fluid are preferably relatively inert and non-reactive with the formation and are presently retained in the fluid, thus do not escape from the fluid into the formation.

The base fluid within which the components of the workover or completion fluids are added and mixed comprises water. The type of base fluid depends on the composition of the formation and reactivity of the base fluid with the formation in which one is operating or carrying out a servicing operation.

Electrolytes can be present in the workover or completion fluid. For instance, if the base fluid is brine, then sodium chloride is present. An electrolyte in the workover and completion fluid can be a water soluble inorganic salt such as the halide and nitrate salts of sodium or potassium and can include ammonium salts, or mixtures thereof. The electrolytes can be selected from the group consisting of sodium chloride, potassium chloride, sodium bromide, potassium bromide, sodium nitrate, potassium nitrate, ammonium nitrate, ammonium chloride, ammonium bromide and the like, and mixtures thereof.

A saturated sodium chloride solution such as brine is preferred as the base fluid in the inventive composition. Such a base fluid has a density of about 10 pounds per gallon. Densities in the range of at least about 14 pounds per gallon after the addition of the electrolyte and selected weighting agents can be obtained. Sea water or brine from the formation can be used for the preparation of workover and completion fluids. This requires less additional salt to make a saturated sodium chloride solution. Sea water or natural brine can also be used as base fluids to which acid-soluble weighting agents can be added to achieve suitable densities. Thus, the instant invention is applicable to workover fluids having densities in the range of about 8 (water as base fluid) to at least about 14 pounds per gallon.

Certain weighting agents which are completely acid-soluble, such as calcium carbonate, barium carbonate, and iron carbonate, are preferred for use in this invention to give densities in the above cited range. These additives are completely acid-soluble and can be dissolved and back flushed with acids to prevent formation damage or plugging. Such acid-soluble weighting agents can be finely ground to improve their suspension in the fluid. Ferric and ferrous oxides can also be used as weighting agents in the inventive compositions, but the carbonates are preferred.

In such a weighted fluid, a non-acid-soluble inorganic material such as a clay like bentonite can be used to improve the suspension of the acid-soluble weighting agent in the workover and completion fluid. Such clays can cause formation damage and negate the effect of the acid soluble weighting agent.

Asbestos is preferably used as a suspending agent for the weighting material in the inventive composition. Asbestos materials used in workover and completion fluids are frequently referred to as mud grade asbestos. Asbestos is relatively inexpensive and relatively soluble in mud acid. Mud grade asbestos used in this invention is preferably at least 90% soluble in a mud acid such as mixed HCl-HF. Of the various types of asbestos which are commercially available, the asbestos derived from chrysotile is presently preferred. The chrysotile asbestos fibers can provide maximum carrying or suspending properties with a minimum amount of asbestos. Chrysotile asbestos is soluble in mud acid (a mixture of HCl and HF). It is also 60 percent soluble in HCl. This is sufficient to allow it to be back-flushed from the formation.

Polymeric viscosifiers can be used to thicken the completion or workover fluid. Natural gums, such as guar gum, biopolysaccharides, and cellulose ethers such as sodium carboxymethylcellulose are preferred viscosifiers. Examples of biopolysaccharides, also known as heteropolysaccharides, are found in U.S. Pat. No. 3,373,810. Examples of cellulose ethers and their salts as suitable additives for drilling and well servicing fluids are found in U.S. Pat. No. 3,727,687, columns 2 and 3. These viscosity additives increase the carrying capacity of the fluid and increase the ability of the fluid to suspend the weighting agents. Certain viscosity-increasing additives also exhibit some effectiveness as fluid loss reduction agents. However, in the present invention, the overall fluid loss reduction property of the workover and completion fluids, and their ability to suspend weighting materials, are greatly enhanced by the addition of mixed polysaccharides.

In one variation of this embodiment of this invention, a specific workover and completion fluid is provided having improved fluid loss control properties, improved suspension of weighting agents, and improved viscosity characteristics. In this variation of this embodiment, a clay-free workover and completion fluid having a density ranging from about 8 to at least about 14 pounds per gallon comprises a base fluid such as water or brine, an acid-soluble weighting agent such as calcium carbonate, asbestos as a suspension agent, a viscosifier, preferably carboxymethylcellulose or salts thereof, and a mixed polysaccharide, preferably a malto-dextrin, as a suspending and fluid loss reduction agent. In the above described composition, the amount of a mixed polysaccharide added can be in the range of about 0.25 to about 8 pounds per barrel of workover or completion fluid (PPB). Preferably, the amount of total mixed polysaccharides thus added is in the range of about 0.5 PPB to about 4 PPB.

As mentioned above, finely ground non-acid-soluble inorganic matter such as clays can be added to a workover or completion fluid to improve the suspension of a weighting agent in the fluid. The addition of these various fine solids as suspension agents to the workover or completion fluid can cause plugging of the producing formation and negate the advantages of acid-soluble weighting material. Thus, clay-free fluids are preferred as workover and completion fluids.

In accordance with another embodiment of this invention, a mixed polysaccharide is added to workover or completion fluids as an acid-soluble suspension agent instead of clays. Mixed polysaccharides such as malto-dextrins, when added to workover or completion fluids, can reduce the gel strength and impart a suitable viscosity to the fluid and thus reduce problems encountered with a highly thixotropic fluid used in completion and servicing work. Surprisingly, it is found that the addition of an effective amount of a mixed polysaccharide to certain workover or completion fluids improves their properties by simultaneously reducing gel strength and shear strength, but increasing yield point and viscosity. Such polysaccharides are thus useful as acid-soluble suspending agents, as the resulting gel strengths of the fluids are high enough to suspend any debris circulated from the well, if circulation ceases before the material reaches the surface, but are low enough to allow entrapped air or gas to escape the fluid in the surface system. (Gases entrained in such fluids can cause problems including the reduction of the density of the fluids.) The effects obtained are in contrast to those obtained upon addition of such polysaccharides to drilling fluids. See, e.g., U.S. Pat. Nos. 3,849,317 and 3,998,742, in which the addition of the same malto-dextrin used in the instant invention to a drilling fluid caused both gel strength and yield point to decrease. Since these are drilling fluids, the pH values are typically high. U.S. Pat. No. 3,849,317 teaches the use of lime, while U.S. Pat. No. 3,998,742 uses NaOH in a low-calcium fluid to maintain a pH of over 10. Such high pH values would be undesirable in an acid-soluble workover or completion fluid, as much additional acid would be required to neutralize excess $OH^-$ ion before the weighting agent could be dissolved. In the instant invention, $Ca(OH)_2$ and NaOH are preferably excluded and the pH is less than 10, preferably in the range of about 7 to less than 10. Sodium carbonate can be added to the inventive workover or completion fluids to reduce the solubility of a calcium carbonate weighting agent at high temperatures. This increases the stability of viscosifiers such as carboxymethylcellulose. While the fluids of the instant invention are effective in suspending weighting agents without excessive retention of gas, the reduced shear strength facilitates the insertion and removal of tools and the startup of rotational operations.

In one variation of this embodiment, the concentration of mixed polysaccharides added to a workover and completion fluid comprising an acid-soluble inorganic suspension agent such as asbestos is in the range of about 1 to about 5 pounds per barrel of workover or completion fluid (PPB). Preferably, the mixed polysaccharides are present in this fluid in a concentration ranging from about 1 PPB to about 3 PPB.

The following examples are provided to illustrate the invention and to provide suitable comparative examples. However, the invention is not to be considered as limited to the particular examples provided, but rather is of the scope hereinabove described and hereinafter claimed.

EXAMPLES

Several workover and completion fluids were made and tested. Unless otherwise specified, each fluid was made in 243 ml of saturated sodium chloride solution. Added to the 243 ml of saturated sodium chloride solution were (1) 2 lb/bbl equivalent of a mud grade asbestos (Flosal ®) asbestos, Trademark of Phillips Petroleum Company), (2) 2 lb/bbl equivalent of a polymeric viscosifier (sodium carboxymethylcellulose), and (3) 295 g of calcium carbonate. The term "bbl or barrel" refers to a measurement barrel having 42.0 U.S. gallons per barrel. Components or additives are listed in terms of pounds per barrel of finished workover or completion fluid. A mixed polysaccharide (Mor-Rex ® 1920 malto-dextrin from Corn Products Company) and any other components, such as sodium carbonate, were added along with the calcium carbonate. After adding the asbestos, the mixture was stirred for 10 minutes with a multi-mixer before sifting in the polymeric viscosifier. After all the polymeric viscosifier had been added, the mixtures were stirred for 20 minutes before finally adding the calcium carbonate and the other components with stirring. The total mixture was stirred for about 2 minutes, poured into brass bombs and purged with nitrogen before sealing and aging at 300° F. After aging at 300° F., the degree of syneresis was estimated by pouring off any free liquid from the cooled composition and calculated as a percent free liquid based on 220 mL sample volume. After thermal aging at 300 F., other properties such as room temperature water loss, shear strengths, flow properties, and gel strengths were measured by conventional techniques. Sodium carbonate was added to stabilize the carboxymethylcellulose at elevated temperatures. The results, which substantiate the effectiveness of the inventive compositions to improve the high temperature fluid loss, gel strength, yield point and shear strength properties of workover and completion fluids and their suspension of the weighting agents, are tabulated below.

Table I compares the properties of a workover or completion fluid containing no mixed polysaccharides with the properties of a workover or completion fluid containing mixed polysaccharides. The data indicate that mixed polysaccharides such as malto-dextrins can significantly reduce the water loss of a workover or completion fluid at high temperatures up to at least 300° F.

The data in Table I also show that the yield point of a workover or completion fluid containing a mixed polysaccharide is significantly higher than a similar fluid containing no mixed polysaccharide additive.

Although the yield point value increases with the addition of the mixed polysaccharide, the gel strength values decrease markedly. This is unusual and unexpected, since in drilling fluids an increase in yield point value is normally accompanied by an increase in gel strength value. See, e.g., U.S. Pat. No. 3,849,317 (col. 5) and U.S. Pat. No. 3,998,742. These gel strengths are still high enough to suspend any debris circulated from the well, if circulation ceases before the material reaches the surface, but are low enough to allow entrapped air or gas to escape the fluid in the surface system. The increase in yield point indicates an increased ability of the fluid to suspend material such as weighting agents.

The lowered shear strength is also advantageous, as discussed earlier.

Table II compares mixed polysaccharides comprising malto-dextrins with certain other materials which can be used to reduce fluid loss. The data in Table II indicate that the mixed polysaccharides are significantly better at reducing high temperature water loss than the materials compared therein. The inventive additive also produces markedly lower shear strength and gel strength, with a yield point higher than produced by other materials.

Table III shows the effect on high temperature water loss caused by changes in the relative concentrations of mixed polysaccharides, asbestos, and sodium carboxymethylcellulose. The data indicate that the amount of asbestos can be significantly varied without increasing the high temperature water loss when mixed polysaccharides are present in the composition.

TABLE I

Fluid: Saturated NaCl water, 295 grams $CaCO_3$, 2 lb/bbl asbestos fiber[1], 2 lb/bbl carboxymethyl cellulose[2], 5 lb/bbl $Na_2CO_3$ Properties after Overnight Aging at 300 F.

| Run No. | Additive | lb/bbl Additive Based On Total Fluid | Syneresis[a] | $DT^b$ (sec) | $SS^c$ | $PV^d$ | $YP^e$ | $GS^f$ | $WL^g$ | pH |
|---|---|---|---|---|---|---|---|---|---|---|
| 1 | Mixed Polysaccharides[3] | 3.0 | 7 | 0 | 65 | 83 | 27 | 4/8 | 3.6 | NA |
| 2 | None | None | 4 | 4 | 200 | 74 | 19 | 8/23 | 17.0 | 8.5 |

[a]Syneresis values indicate the volume of fluid appearing as a separate phase based on the total initial volume, e.g., based on an initial sample volume of 100 mL, a value of "7" indicates that after aging of an initial 100 mL sample, a separate liquid phase of 7 mL appeared.
[b]DT (sec) represents dispersion time in seconds.
[c]SS represents shear strength in lb/100 ft².
[d]PV represents plastic viscosity in centipoise.
[e]YP represents yield point in lb/100 ft².
[f]GS represents gel strength values in lbs/100 sq. ft. taken at 10 sec/10 min.
[g]WL represents water loss in mL/30 min.
[1]Flosal ® fiber asbestos was used (trademark of Phillips Petroleum Co., Bartlesville, Oklahoma).
[2]DRISPAC SUPERLO ® carboxymethyl cellulose was used (trademark of Phillips Petroleum Co., Bartlesville, Oklahoma).
[3]The mixed polysaccharides are commercially available malto-dextrins. Mor-Rex ® 1920 (malto-dextrins) is a trademark of Corn Products Co.

TABLE II

Fluid: Saturated NaCl water, 295 grams $CaCO_3$, 2 lb/bbl asbestos fiber[1], 2 lb/bbl carboxymethyl cellulose[2], 5 lb/bbl $Na_2CO_3$ Properties after Aging 3 Days at 300 F.

| Run No. | Additive | lb/bbl Additive Based On Total Fluid | Syneresis[a] | $DT^b$ (sec) | $SS^c$ | $PV^d$ | $YP^e$ | $GS^f$ | $WL^g$ | pH |
|---|---|---|---|---|---|---|---|---|---|---|
| 3 | None | None | 0 | 16 | 650 | 40 | 22 | 32/92 | 54.0 | NA |
| 4 | Mixed Polysaccharides[3] | 3 | 2 | 0 | 90 | 71 | 19 | 3/7 | 3.6 | 8.2 |
| 5 | CFR2[4] | 3 | 0 | 36 | 400 | 117 | 26 | 14/43 | 11.8 | 8.4 |
| 6 | Sulfonated Asphalt[5] | 3 | 0 | 134 | 750 | 85 | 5 | 7/43 | 33.0 | 8.4 |
| 7 | Sulfomethylated Quebracho[6] | 3 | 3 | 0 | 245 | 77 | 16 | 3/11 | 12.8 | 8.4 |

[a-g]Footnotes a-g are as defined in footnotes a-g in Table I.
[1]Defined in footnote 1 in Table I.
[2]Defined in footnote 2 in Table I.
[3]Defined in footnote 3 in Table I.
[4]CFR2 (Halliburton Co.) contains naphthalene sulfonate formaldehyde condensate.
[5]Sulfonated asphalt, i.e., Soltex ® sulfonated asphalt (trademark of Phillips Petroleum Co.).
[6]Sulfomethylated quebracho from Arnold and Clark Co.

TABLE III

Fluid: Saturated NaCl water, 295 grams $CaCO_3$, 5 lb/bbl $Na_2CO_3$

| | lb/bbl Additive Based On Total Fluid | | | Properties after Aging at 300 F. Overnight | | | | | | | |
|---|---|---|---|---|---|---|---|---|---|---|---|
| Run No. | Asbestos | $CMC^2$ | $MP^3$ | Syneresis[a] | $DT^b$ (sec) | $SS^c$ | $PV^d$ | $YP^e$ | $GS^f$ | $WL^g$ | pH |
| 8 | 0 | 2 | 3 | 19 | 0 | 65 | 51 | 13 | 2/6 | 8.0 | 8.6 |
| 9 | 1 | 2 | 3 | 6.7 | 0 | 55 | 79 | 9 | 2/7 | 3.0 | 8.4 |
| 10 | 2 | 2 | 3 | 7 | 0 | 65 | 83 | 27 | 4/8 | 3.6 | NA |

TABLE III-continued

| | | | Fluid: Saturated NaCl water, 295 grams CaCO₃, 5 lb/bbl Na₂CO₃ | | | | | | | |
|---|---|---|---|---|---|---|---|---|---|---|
| lb/bbl Additive Based On Total Fluid | | | Properties after Aging at 300 F. Overnight | | | | | | | |
| Run No. | Asbestos | CMC² | MP³ Syneresis$^a$ | DT$^b$ (sec) | SS$^c$ | PV$^d$ | YP$^e$ | GS$^f$ | WL$^g$ | pH |
| 11 | 3 | 2 | 3          6 | 4 | 90 | 74 | 14 | 3/6 | 3.6 | 8.5 |

$^{a-g}$Footnotes a–g are defined in footnotes a–g in Table I.
¹Defined in footnote 1 in Table I.
²Defined in footnote 2 in Table I.
³Defined in footnote 3 in Table I.
MP represents mixed polysaccharides, i.e., Mor-Rex ® Corn Products Co.

Those skilled in the art will see modifications which can be made in the above composition and methods. For instance, other viscosity reducers can be added to the composition to reduce the viscosity to an acceptable level. Also, formation sealants, such as cottonseed hulls, cane fibers, nutshells, etc. can be added to the workover and completion fluids. Furthermore, an additive to counteract contaminants such as cement, salt, and anhydrite (anhydrous CaSO₄), etc. can be added. Emulsifiers and de-emulsifiers may also be present in the composition. Corrosion inhibitors such as sodium chromate or filming amines or the like may be added to the fluids. Bactericides such as paraformaldehyde may also be added to the workover and completion fluids of this invention to preserve and protect the components of the fluid from degradation by microorganisms.

Thus, reasonable variations and modifications which will become apparent to those skilled in the art can be made in this invention without departing from the spirit and scope thereof.

While this invention has been described in detail for the purpose of illustration, it is not to be construed as limited thereby, but is intended to cover all the changes and modifications within the spirit and scope thereof.

I claim:

1. A method for reducing the loss of fluid into a formation from a water base workover or completion fluid which is substantially free of clay and has a pH of less than 10 during workover or completion operations in a cased borehole, which method comprises incorporating into the workover or completion fluid an effective amount of a mixed polysaccharide selected from the group consisting of malto-dextrins, fructo-dextrins and lacto-dextrins such that said fluids ability to suspend weighting agents is improved and a suitable viscosity is maintained.

2. A method in accordance with claim 1, wherein said polysaccharide is added in a quantity such that said fluid's gel strength and shear strength are decreased, while yield point is increased over the polysaccharide-free fluid.

3. A method in accordance with claim 1, wherein said mixed polysaccharide is a malto-dextrin derived from hydrolyzed cereal solids.

4. A method in accordance with claim 3, wherein said malto-dextrin has a measurable dextrose equivalent value of less than about 20, and weight percentages of dextrose less than about 2.4 and of maltose less than about 9.

5. A method in accordance with claim 1, wherein said mixed polysaccharide comprises from about 10 to 25 weight percent of di-saccharides, tri-saccharides, tetra-saccharides and penta-saccharides, from about 70 to 85 weight percent of hexa-saccharides and above, with a minor portion of less than about 9 weight percent of dextrose.

6. A method in accordance with claim 1 wherein said mixed polysaccharide is present in the workover or completion fluid in the concentration of from about 0.25 to about 8 pounds per barrel of said fluid.

7. A method in accordance with claim 1 wherein, and the pH of said fluid is the range from about 7 to less than 10, and wherein the temperature of said fluid is up to about 400° F.

8. A workover or completion fluid which is substantially free of clay, having a density of at least 8 pounds per gallon and a pH of less than 10, comprising:
    (a) a water base fluid,
    (b) a viscosifier, and
    (c) a mixed polysaccharide selected from the group consisting of malto-dextrins, fructo-dextins, and lacto-dextrins, in an amount such that said fluids ability to suspend weighting agents is improved and a suitable viscosity is maintained.

9. A fluid in accordance with claim 8, wherein said mixed polysaccharide is a malto-dextrin derived from hydrolyzed cereal solids.

10. A fluid in accordance with claim 9, wherein said malto-dextrin has a measurable dextrose equivalent value of less than about 20, and weight percentages of dextrose less than about 2.4 and of maltose less than about 9.

11. A fluid in accordance with claim 8, wherein said mixed polysaccharide comprises from about 10 to 25 weight percent of di-saccharides, tri-saccharides, tetra-saccharides and penta-saccharides, from about 70 to 85 weight percent of hexa-saccharides and above, with a minor portion of less than about 9 weight percent of dextrose.

12. A workover or completion fluid in accordance with claim 8, wherein said mixed polysaccharide is present in the workover or completion fluid in the concentration of from about 0.25 to about 8 pounds per barrel of said fluid.

13. A workover or completion fluid in accordance with claim 8, further containing an acid-soluble suspension agent.

14. A workover or completion fluid in accordance with claim 13, wherein said suspension agent is mud grade asbestos.

15. A workover or completion fluid in accordance with claim 14, wherein said mixed polysaccharide is present in the workover or completion fluid in the concentration of from about 1 to about 5 pounds per barrel of said fluid.

16. A workover or completion fluid in accordance with claim 8 wherein an acid-soluble weighting agent is present in an effective amount to give the required fluid density.

17. A workover or completion fluid in accordance with claim 15 having a density ranging from about 8 to about 14 pounds per gallon.

18. A workover or completion fluid in accordance with claim 15 wherein said weighting agent is selected from the group consisting of iron carbonate, barium carbonate, calcium carbonate, and mixtures thereof.

19. A workover or completion fluid in accordance with claim 8 wherein said viscosifier is selected from the group consisting of natural gums, biopolysaccharides and cellulose ethers.

20. A workover or completion fluid in accordance with claim 19 wherein said viscosifier is sodium carboxymethylcellulose.

21. A workover or completion fluid in accordance with claim 8, further containing an effective amount of an electrolyte selected from the group consisting of sodium chloride, potassium chloride, sodium bromide, potassium bromide, sodium nitrate, potassium nitrate, ammonium nitrate, ammonium chloride, ammonium bromide, and mixtures thereof.

22. A workover or completion fluid which is substantially free of clay, having a density of at least 8 pounds per gallon and a pH of less than 10, comprising
   (a) a water base fluid,
   (b) a viscosifier and
   (c) a malto-dextrin in an amount effective to improve said fluid's ability to suspend weighting agents and maintain a suitable viscosity.

23. A workover or completion fluid in accordance with claim 22, wherein said maltodextrin is present in an amount effective to decrease the gel strength and shear strength of said fluid while increasing the yield point.

24. A workover or completion fluid in accordance with claim 22, wherein said malto-dextrin is derived from hydrolyzed cereal solids, has a measurable dextrose equivalent value of less than about 20, and contains in the range of from about 70 to about 85 weight percent of hexa-saccharides and above.

* * * * *